United States Patent
Zarfoss, III et al.

(10) Patent No.: US 8,863,255 B2
(45) Date of Patent: Oct. 14, 2014

(54) SECURITY CREDENTIAL DEPLOYMENT IN CLOUD ENVIRONMENT

(75) Inventors: James R. Zarfoss, III, Los Gatos, CA (US); Yong Yuan, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 76 days.

(21) Appl. No.: 13/617,505

(22) Filed: Sep. 14, 2012

(65) Prior Publication Data

US 2014/0082349 A1    Mar. 20, 2014

(51) Int. Cl.
*H04L 29/06* (2006.01)

(52) U.S. Cl.
CPC ..................................... *H04L 63/08* (2013.01)
USPC ................... 726/6; 726/5; 713/155; 713/168

(58) Field of Classification Search
None
See application file for complete search history.

(56) References Cited

U.S. PATENT DOCUMENTS

| | | | | |
|---|---|---|---|---|
| 8,468,455 | B2 * | 6/2013 | Jorgensen et al. | 715/733 |
| 8,505,083 | B2 * | 8/2013 | Kuzin et al. | 726/8 |
| 2011/0197065 | A1 * | 8/2011 | Stauth et al. | 713/170 |
| 2012/0054744 | A1 * | 3/2012 | Singh et al. | 718/1 |
| 2012/0110330 | A1 | 5/2012 | Dickgiesser et al. | |
| 2014/0082350 | A1 | 3/2014 | Zarfoss, III et al. | |

OTHER PUBLICATIONS

Wei et al., Managing Security of Virtual Machine Images in a Cloud Environment, ACM, 2009.*

* cited by examiner

*Primary Examiner* — Minh Dinh
(74) *Attorney, Agent, or Firm* — Patterson + Sheridan, LLP

(57) ABSTRACT

Techniques are described for deploying a security credential for an application deployed in a cloud. An encrypted security credential is received from a remote system and is inserted into a virtual machine image associated with the application. Upon deploying the virtual machine image as a virtual machine instance, embodiments transmit a request to a cryptex server for a decrypted security credential, the request including the encrypted security credential and a virtual machine identifier for the virtual machine instance. The cryptex server is configured to retrieve metadata associated with the virtual machine identifier and to authenticate the virtual machine instance using the retrieved metadata. Embodiments receive, from the cryptex server, the decrypted security credential for use by the application.

18 Claims, 6 Drawing Sheets

SECURITY CREDENTIAL DEPLOYMENT IN CLOUD ENVIRONMENT

BACKGROUND OF THE INVENTION

1. Field of Invention

Embodiments of the present invention generally relate to network security, and more specifically, to deploying a security credential for an application deployed in a cloud.

2. Description of Related Art

Security of confidential information remains a vital concern for any entity that stores sensitive information or transmits it across both secure and insecure networks alike. Many systems employ a credential store to identify and authenticate specific users of a system and control that specific user's access to certain applications, files and other sensitive data. Perhaps the most common authentication mechanism is a password. Static, user-selected passwords are inherently limited as protection devices, however, because of the relatively small number of bits of information they contain. In addition, users tend to select easy-to-guess passwords, thereby compromising the authentication process.

One-time passwords overcome many of these limitations. In a one-time password system the password changes every time it is used. Instead of a static phrase, the system assigns a static mathematical function. The result is a "dynamic password." In one dynamic password system, the system provides an argument for the function and the user computes and returns the function value. This approach is termed "challenge/response." In challenge/response, a password generating device such as a token card receives a value from the system and computes a one-time password by plugging the value into a complex mathematical function. The one-time password is then transmitted to the system in order to authenticate the user. Challenge/response devices can be implemented in either hardware or software and are very effective for user authentication.

Additionally, smart cards have been proposed for use in user authentication. For instance, smart cards can be used to carry a user's identity securely and conveniently. In a typical smart card authentication system, users approach a terminal and insert their smart cards into a smart card reader. The system queries the smart card through the smart card reader and performs a user authentication based, for instance, on a one-time password.

Public key cryptography promises an even more effective means of authenticating a user. In public key cryptography, cryptographic keys come in public key/private key pairs. The public key is used for encrypting data while the private key is used for decrypting data. For instance, the public key/private key pair could be assigned to a user. Here, the public key could be used by others to encrypt data, while the encrypted data can only be read by the owner of the corresponding private key.

SUMMARY OF THE INVENTION

One embodiment of the invention disclosed herein includes a method of deploying a security credential for an application deployed in a cloud. The method includes receiving an encrypted security credential from a remote system. The method further includes inserting the encrypted security credential into a virtual machine image associated with the application. Additionally, the method includes, upon deploying the virtual machine image as a virtual machine instance, transmitting a request to a cryptex server for a decrypted security credential, the request including the encrypted security credential and a virtual machine instance identifier for the virtual machine instance. Here, the cryptex server is configured to retrieve metadata associated with the virtual machine identifier and to authenticate and authorize the virtual machine instance using the retrieved metadata. The method also includes receiving, from the cryptex server, the decrypted security credential for use by the application.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
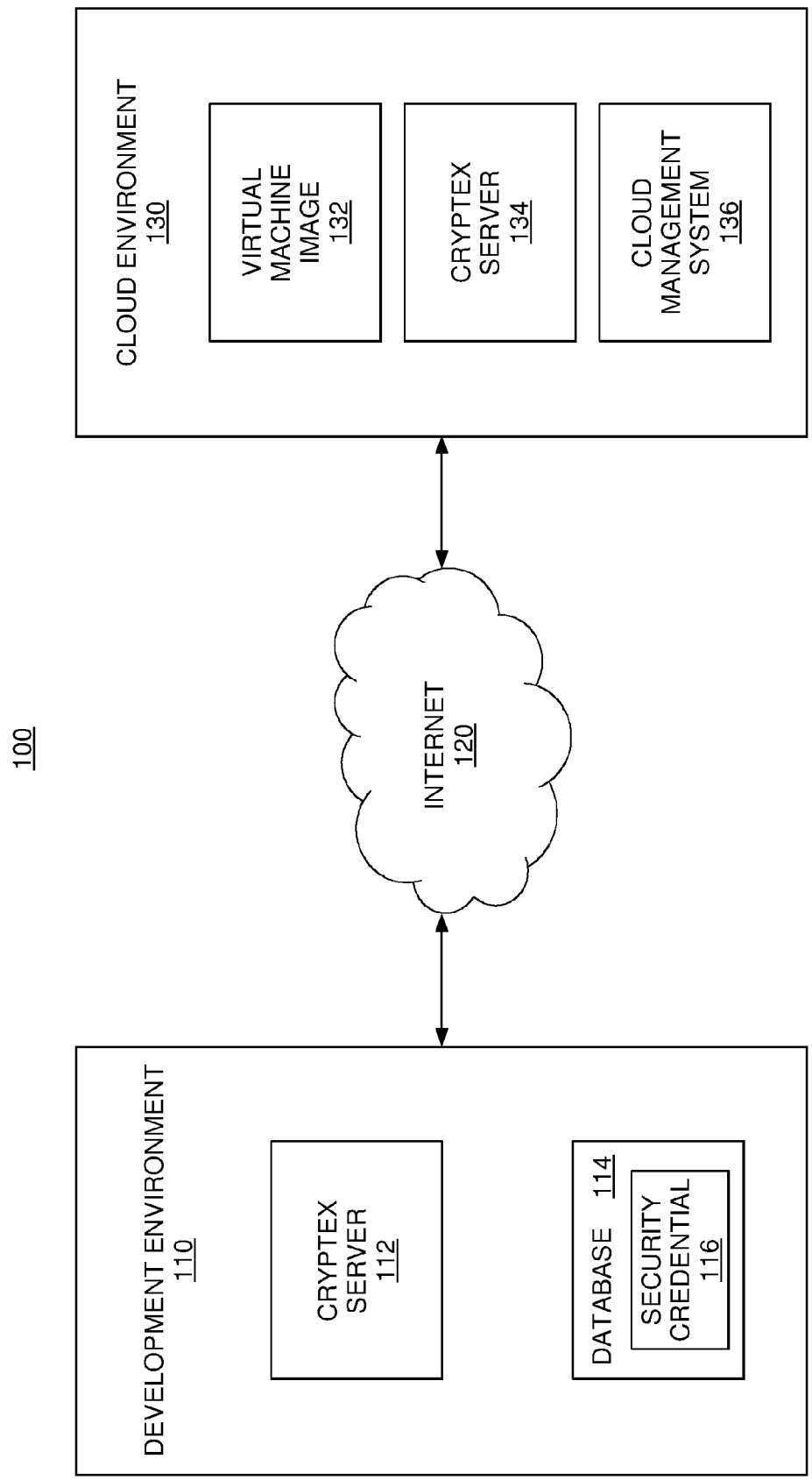
FIG. 1 illustrates a computing infrastructure configured to implement one or more aspects of the present invention.

Generally speaking, authentication of a user through public key cryptography is a relatively straightforward process. Under the Public Key Infrastructure (PKI), each user possesses a unique distinguished name. For example, assume that a user "Alice" generates a unique distinguished name and a public/private key pair. The distinguished name is associated with Alice's public key via an X509 Certificate signed by the trusted Certificate Authority (CA). In such a system, Alice keeps her private key secret and publishes her certificate with the CA.

Alice's public key is used to encrypt data so that only Alice, with her private key, can decrypt it. In a PKI-based system, a user wishing to communicate securely with Alice retrieves her certificate from the CA, obtains the associated public key and encrypts the communications with Alice's public key. In addition, Alice's private key can be used to produce a digital signature. The digital signature verifies that Alice signed the data and maintains the integrity of the data being transferred. To verify the signature, the user retrieves Alice's certificate from the CA and processes the signature with the associated public key. The CA, therefore, is an integral part of the Public Key Infrastructure.

To-date there has been no cohesive approach to public key authentication. Digital certificates can be used to standardize how identities, rights and privileges are assigned to users but, although server-side digital certificates are becoming common, there are few applications which supply certificate-based credentials to individual users. Directory services may provide standard, enterprise-wide storage for information about users and systems, but to-date, directory services are not widely deployed. Smart cards may become a ubiquitous medium for safeguarding and transporting a user's credentials, but to-date, deployment costs and changing standards have slowed the deployment of smart cards for user authentication.

Additionally, cloud computing is an emerging technology in the information technology (IT) industry. Cloud computing allows for the moving of applications, services and data from desktop computers back to a main server farm. Thus, while application development may continue onsite, the server farm may be off premises and be implemented as a service. By relocating the execution of applications, deployment of services, and storage of data, cloud computing offers a systematic way to manage costs of open systems, centralize information, and enhance robustness and reduce energy costs.

It is broadly contemplated that embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

One challenge when deploying applications to a cloud is deploying a security credential for one of the applications in the cloud. While a deployed application could ideally request a security credential and have such a credential provided automatically, such a request typically requires that the application provide some sort of credentials information for authentication and authorization purposes. However, where the application is requesting its first security credential, the application may be unable to provide any sort of credentials information until the request is processed, thus creating a sort of "chicken and egg" problem. That is, the application does not have access to the security credential until the request has been processed, but needs the security credential in order for the request to be processed (i.e., for authentication and authorization purposes). As a result, security credential deployments are currently done using a manual process, where a system administrator generates the security credential in the network environment and manually deploys the security credential to the application in the cloud. Moreover, such a manual deployment is generally considered highly undesirable in cloud computing environments, since the rate of machine deployment tends to be much higher in cloud environments, where physical constraints do not apply in the same way as with traditional data centers (where deployments are limited by the number of physical machines available).

As such, embodiments provide techniques for deploying a security credential for an application deployed in a cloud. Embodiments may receive a request to deploy the security credential. In one embodiment, the request is received outside of the cloud environment (e.g., in a development environment). Such a request could specify, for instance, the application for which the security credential is requested and could also include authentication information for obtaining the security credential. The authentication information could include, as an example, login and password information for a user making the request. Additionally, the authentication information could include any additional information which may help in conducting forensic analysis if the system is later compromised. Such additional information could include one or more timestamps associated with the request, IP addresses for systems involved in the request, and the like. Embodiments could then access a data store using the authentication information to retrieve the security credential. In one embodiment, the data store is a database and is accessed using login and password information included in the request.

Upon obtaining the security credential from the data store, embodiments encrypt the security credential. For instance, the security credential could be encrypted using RSA public key/private key encryption techniques. Moreover, additional authentication components such as an RSA signature or a hash-based message authentication code (HMAC) value may be provided for the security credential, which help to ensure the authenticity of the security credential when it is later decrypted. More generally, however, it is broadly contemplated that any form of encryption and authentication, known or unknown, could be used. Embodiments then transmit the encrypted security credential to a cloud management system. Advantageously, by encrypting the security credential before transmitting the security credential to the cloud management system, embodiments provide additional security when transmitting the security credential across a network (e.g., the Internet).

Upon receiving the encrypted security credential (e.g., from a development system), embodiments inserting the encrypted security credential into a virtual machine image associated with the application. Generally, the virtual machine image represents a file (or multiple files) that can be deployed as a virtual machine within the cloud. Upon deploying the virtual machine image, embodiments transmit a request to a cryptex server (e.g., a software and/or hardware component configured to manage keys and perform various associated cryptographic operations) for a decrypted security credential, based on the encrypted security credential inserted into the virtual machine image. Generally, the cryptex server represents a computing system (physical or virtual) with software capable of performing encryption and decryption operations. Additionally, the cryptex server may perform authentication and/or authorization operations for incoming requests, before performing any request encryption or decryption operation. In one embodiment, the cryptex server is a second virtual machine instance deployed within the cloud computing environment.

The request transmitted to the cryptex server could include, for instance, the encrypted security credential and a virtual machine instance identifier for the deployed virtual machine instance. For instance, a cloud management system could assign a unique virtual identifier to each virtual machine instance deployed within the cloud, and the request transmitted to the cryptex server could specify the virtual machine instance identifier for the virtual machine instance into which the encrypted security credential was inserted. Upon receiving the request, the cryptex server could be configured to retrieve metadata associated with the virtual machine identifier and to authenticate the deployed virtual machine instance using the retrieved metadata. As an example, the cryptex server could query a cloud management system to determine a network address (e.g., an Internet Protocol (IP) address within the cloud network) associated with the virtual machine instance identifier specified in the request. The cryptex server could then compare the determined network address with the network address from which the request was received and the cryptex server could determine that authentication was successful if the two network addresses match. Embodiments then receive the decrypted security credential from the cryptex server for use by the application. Advantageously, doing so provides an automated, secure technique for deploying a security credential for an application deployed in a cloud.

In addition to (or in lieu of) the use of a network address associated with the virtual machine instance, embodiments may query the cloud management system to determine other virtual machine metadata for use in authenticating the virtual machine instance from which the request is received. For instance, the cryptex server could query the cloud management system to determine a label associated with the virtual machine image and could confirm that the determined label matches a second label specified in the received request. Additionally, the cryptex server could query the cloud management system to determine a region and/or a datacenter that the image is deployed in, and could confirm that the request was received from the region and/or datacenter corresponding to the image. As yet another example, the cryptex server could query the cloud management system to determine a group (e.g., a security group) that the virtual machine image belongs to, and could confirm that the request was received from a virtual machine belonging to the determined group. Advantageously, by performing some or all of these authentication operations, embodiments help to ensure that the encrypted token is deployed to the correct virtual machine. For instance, if a system administrator deploys the encrypted security credential to the wrong virtual machine image, the cryptex server could determine that the virtual machine metadata received from the cloud management system does not match the metadata of the requesting virtual machine instance and could avoid decrypting the security credential, therefore preventing the unencrypted security credential from being deployed to the wrong virtual machine.

FIG. 1 illustrates a computing infrastructure configured to implement one or more aspects of the present invention. As shown, the computing infrastructure 100 includes a development environment 110 and a cloud computing environment 130, connected via the Internet 120. Although the development environment 110 and the cloud computing environment 130 are connected via the Internet 120 in the depicted embodiment, it is broadly contemplated that the environments 110 and 130 may be connected by any computer network.

As shown, the development environment 110 includes a cryptex server 112 and a database 114. The database 114 contains a security credential 116. The cloud environment 130 contains a virtual machine image 132, a cryptex server 134 and a cloud management system 136. Generally, the virtual machine image 132 represents a file (or set of files) that can be deployed as a virtual machine within the cloud. The cloud management system 136 represents an application (or set of applications) which perform management operations for the cloud environment 130. For example, cloud management system 136 could maintain metadata describing deployed virtual machine instances in the cloud environment 130. Such metadata could include, for example, a unique virtual machine instance identifier assigned to deployed virtual machine and network information associated with the deployed virtual machine (e.g., a network address assigned to the deployed virtual machine). Additionally, or in lieu of the virtual machine instance identifier and the network information, the metadata could include a label of the virtual machine image, a location where the virtual machine image is deployed, a timestamp of the virtual machine image deployment, and so on.

As discussed above, the cryptex servers 112 and 134 generally represent computing systems (physical or virtual) with software capable of performing cryptography operations (e.g., encryption, decryption, signature operations, etc.), and which may also perform authentication and/or authorization operations for incoming requests, before performing any request encryption or decryption operation. In one embodiment, the cryptex server 134 is a second virtual machine instance deployed within the cloud computing environment 130. Although the cryptex servers 112 and 134 are shown as residing within the development environment 110 and cloud environment 130, respectively, such a depiction is for illustrative purposes only. More generally, the cryptex servers 112 and 134 may be located in the development environment 110, the cloud environment 130 or even another environment altogether. Moreover, in a particular embodiment, the cryptex servers 112 and 134 are implemented as a single cryptex server that is accessible by both the development environment 110 and the cloud environment 130 (e.g., via the Internet 120).

Embodiments provide techniques for deploying a security credential for an application deployed in a cloud. The cryptex server 112 could receive a request to deploy the security credential (e.g., from a user). Such a request could specify, for instance, the application for which the security credential is requested and could also include authentication information for obtaining the security credential. The authentication information could include, as an example, login and password information for a user making the request. The cryptex server 112 could then access the database 114 using the authentication information to retrieve the security credential 116. For instance, the cryptex server 112 could specify the login and password received in the request and the database 114 could use the login and password to authenticate and perform authorization operations for the user submitting the request. Upon authenticating and authorizing the user, the database 114 could return the security credential 116 to the cryptex server 112.

Upon obtaining the security credential from the data store, the cryptex server 112 could encrypt the security credential 116. For instance, the security credential could be encrypted using RSA public key/private key encryption techniques. More generally, however, it is broadly contemplated that any form of encryption and authentication operations, known or unknown, could be used. The cryptex server 112 could then transmit the encrypted security credential to a cloud management system 136, to be inserted into the virtual machine image 132. Advantageously, by encrypting the security before transmitting the security credential to the cloud management system, embodiments provide additional security when transmitting the security credential across a network (e.g., the Internet).

Upon receiving the encrypted security credential, the cloud management system 136 could insert the encrypted security credential into the virtual machine image 132 (i.e., the virtual machine image associated with the application for which the security credential is being deployed). Generally, the virtual machine image represents a file (or multiple files) that can be deployed as a virtual machine within the cloud environment 130. Upon deploying the virtual machine instance as a virtual machine within the cloud environment 130, software on the deployed virtual machine (e.g., the application for which the security credential is being deployed) could transmit a request to the cryptex server 134 for a decrypted security credential. As discussed above, the cryptex server 134 generally represents a computing system (physical or virtual) with software capable of performing encryption and decryption operations. Additionally, the cryptex server 134 may perform authentication and/or authorization operations for incoming requests, before performing any request encryption or decryption operation. Thus, for example, assuming the application for which the security credential is being deployed transmits the request to the cryptex server 134 for the decrypted security credential, the cryptex server 134 could perform authentication and authorization operations on the application.

In one embodiment, the request transmitted to the cryptex server includes the encrypted security credential and a virtual machine instance identifier for the deployed virtual machine instance 132. For instance, the cloud management system 136 could assign a unique virtual identifier to each virtual machine deployed within the cloud environment 130, and the request transmitted to the cryptex server 134 could specify the virtual machine instance identifier for the deployed virtual machine image 132 into which the encrypted security credential was inserted. Continuing the example, upon receiving the request, the cryptex server 134 could be configured to retrieve metadata associated with the virtual machine identifier and to authenticate the deployed virtual machine instance using the retrieved metadata.

For instance, the cryptex server 134 could query the cloud management system 136 to determine a network address (e.g., an IP address within the cloud network) associated with the virtual machine instance identifier specified in the request. The cryptex server 134 could then compare the determined network address with the network address from which the request was received and the cryptex server 134 could determine that authentication was successful if the two network addresses match. As discussed above, the cryptex server 134 could authenticate the requestor using other metadata for the virtual machine image (or virtual machine instance). Such metadata could include, for instance, a label for the virtual machine image, a timestamp specifying when the virtual machine image was deployed, a physical location (e.g., a geographic location, a datacenter, etc.) where the virtual machine image was deployed, and so on. Upon authenticating the application, the cryptex server 134 could decrypt the encrypted security credential and could return the decrypted security credential to the application. Advantageously, doing so provides an automated, secure technique for deploying a security credential for an application deployed in a cloud.

Figure 2A:
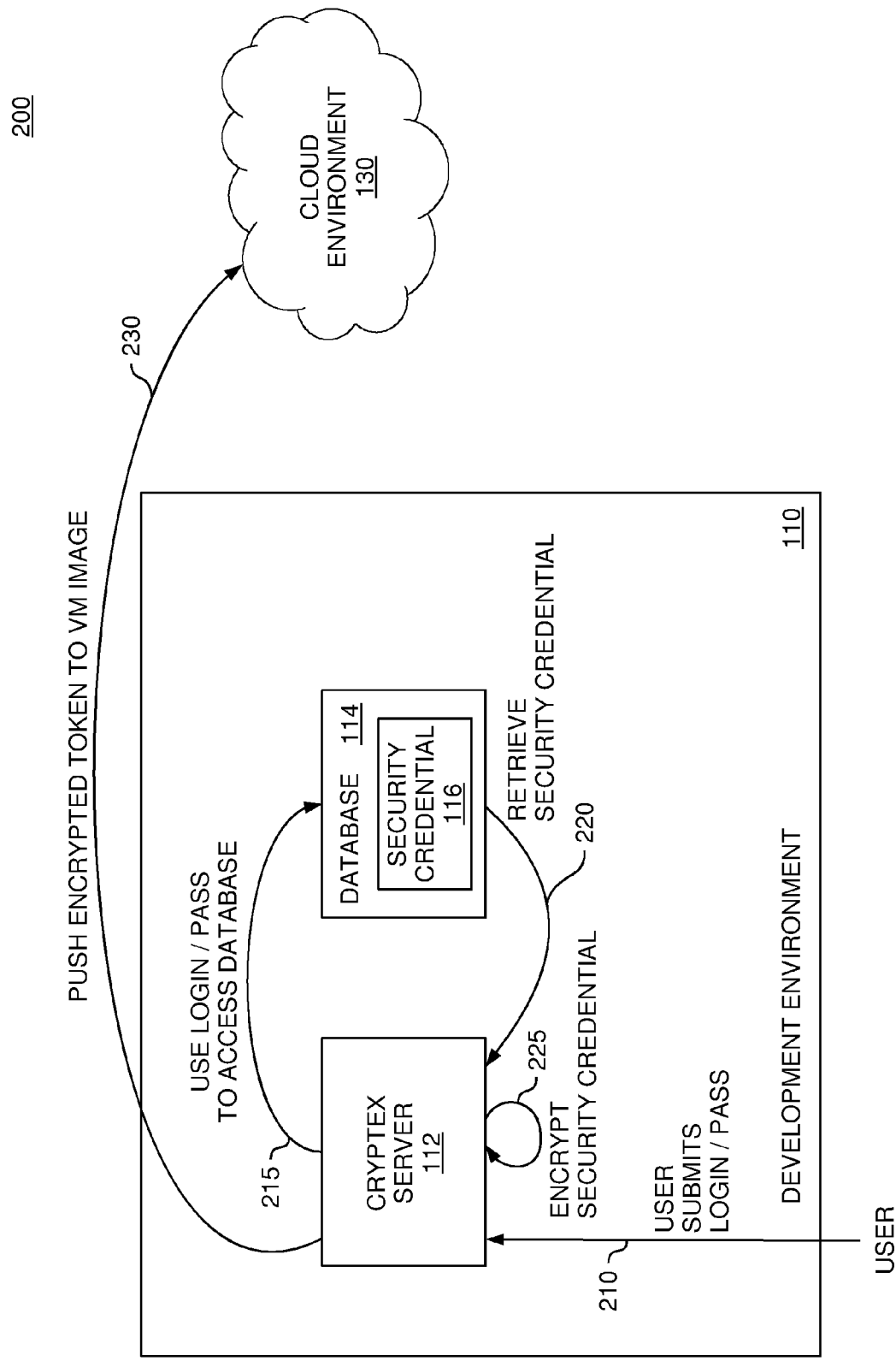
FIGS. 2A-B are flow diagrams illustrating a system configured to implement one or more aspects of the present invention.
Figure 2B:
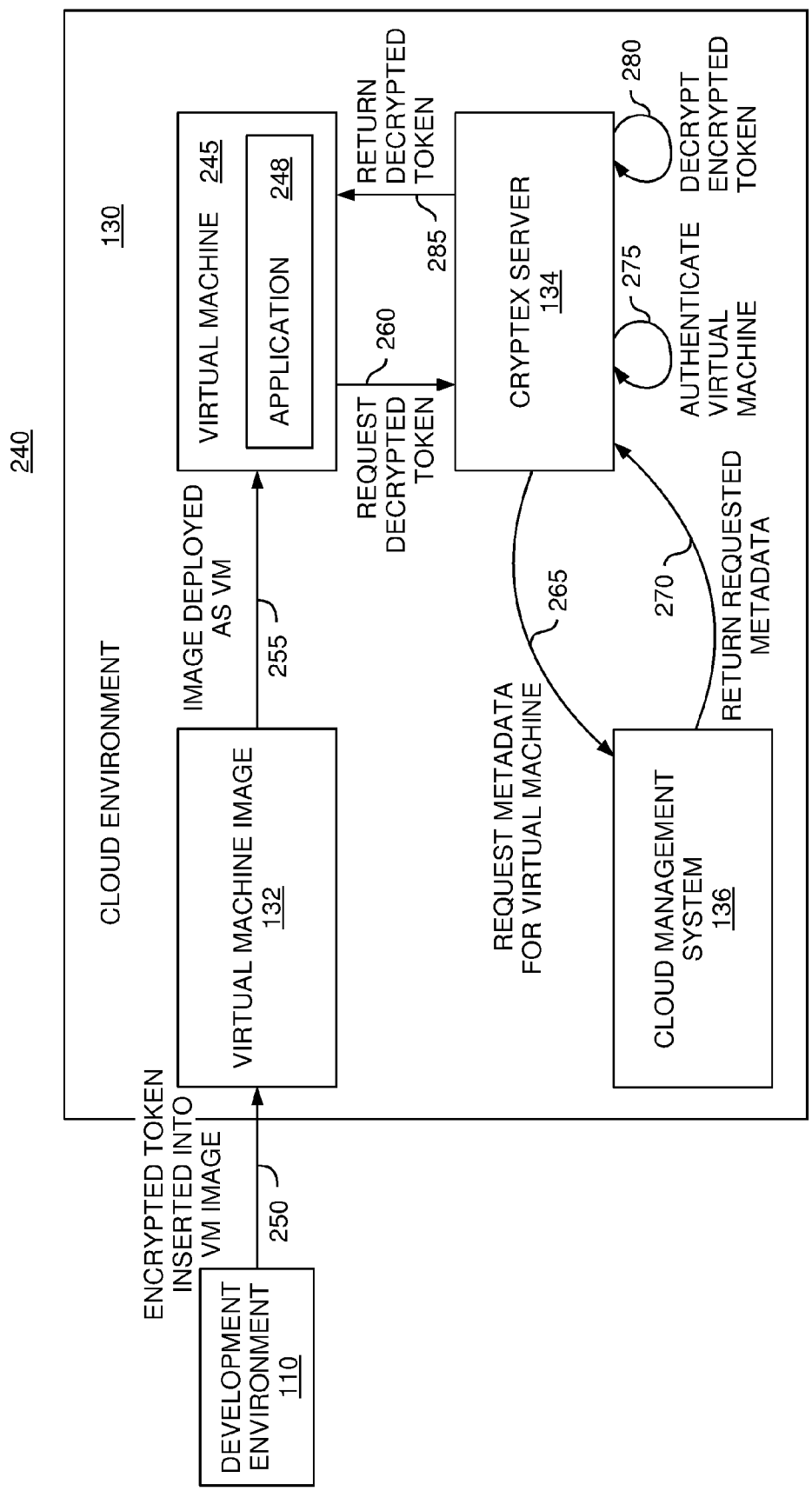

FIGS. 2A-B are flow diagrams illustrating a system configured to implement one or more aspects of the present invention. Generally, FIG. 2A relates to operations performed in the development environment 110, while FIG. 2B relates to operations performed in the cloud environment 130. As shown in FIG. 2A, the flow diagram 200 begins at block 210, where a user submits a request to deploy a security credential for an application that includes a login and password. Such a request could also designate the application for which the security credential is being deployed. For example, the request could specify a virtual machine image on which the application resides, and could further specify a location for the application on the virtual machine instance (e.g., a path of the application on the file structure of the virtual machine image). Such information could subsequently be used, for instance, to authenticate the virtual machine instance when the virtual machine instance requests the encrypted security credential be decrypted.

Upon receiving the request, the cryptex server 112 uses the login and password information to access the database 114 and to retrieve the security credential 116 (block 215). The database 114 could authenticate the user's credentials (i.e., the login and password) and could determine whether the user has authorization to retrieve the security credential 116 from the database 114. Upon determining that the authentication and authorization operations succeeded, the database 114 returns the security credential to the cryptex server 112 (block 220). The cryptex server 112 then receives the security credential and encrypts the security credential (block 225). For example, the cryptex server 112 could encrypt the security credential using RSA public key/private key encryption techniques. Once the security credential is encrypted, the cryptex server 112 pushes the encrypted token to the VM image (e.g., the VM image specified in the request at block 210) in the cloud environment 130.

Turning now to FIG. 2B, the flow diagram 240 begins at block 250, where the encrypted token (i.e., the encrypted security credential) is received from the development environment 110 and is inserted into the virtual machine image 132 corresponding to the specified application for which the security credential is being deployed. Of note, although FIG. 2B illustrates the encrypted token as received from a development environment, it is broadly contemplated that the token can be received from any computing system in any sort of environment (including elsewhere in the cloud environment or a different cloud environment), consistent with embodiments described herein. At some later point in time, the virtual machine image 132 is deployed as the virtual machine 245 (block 255). As shown, the deployed virtual machine 245 includes the application 248 for which the security credential is being deployed. At this point, although the security credential has been deployed to the virtual machine 245 hosting the application 248, the security credential is still in an encrypted state and thus is unusable by the application 248.

Accordingly, the application 248 transmits a request to the cryptex server 134 for the security token to be decrypted (block 260). Such a request may specify, for instance, a unique virtual machine identifier for the virtual machine 245. That is, the cloud environment 130 may be configured such that each deployed virtual machine is assigned a unique identifier within the cloud environment 130, and the request could include the assigned unique identifier for the virtual machine 245. Of note, although the cryptex server 134 is shown as residing within the cloud environment 130 in the diagram 240, such a depiction is without limitation and is provided for illustrative purposes only. More generally, the cryptex server 112 and the cryptex server 134 may be located in one or more of the development environment 110, the cloud environment 130 or another environment altogether. Moreover, in one embodiment, the cryptex server 112 and the cryptex server 134 are implanted as a single server entity that is accessible from both the development environment 110 and the cloud environment 130.

Upon receiving the request, the cryptex server 134 requests metadata for the virtual machine 245 from the cloud management system 136 (block 265). For example, in an embodiment where the application 248 provides the unique virtual machine identifier for the virtual machine 245 to the cryptex server 134, the cryptex server 134 could query the cloud management system 136 for information regarding the unique virtual machine identifier. Responsive to the query, the cloud management system 136 returns the requested metadata to the cryptex server 134 (block 270).

The cryptex server 134 then uses the returned metadata to authenticate the virtual machine 245 (block 275). For example, the metadata could specify an IP address assigned to the virtual machine associated with the unique virtual machine identifier, and the cryptex server 134 could compare the assigned IP address with the IP address from which the request for the decrypted token was received (i.e., the IP address of the virtual machine 245). If the two IP addresses match, the cryptex server 134 could determine that the authentication operation was successful. While the cryptex server 134 is configured to authenticate the virtual machine 245 using an IP address in the depicted example, a variety of other authentication techniques could be employed consistent with the present disclosure. Additionally, the cryptex server 134 could authenticate the requesting application (i.e., the application 248) rather than (or in addition to) the virtual machine 245.

In addition to performing authentication operations, the cryptex server 134 may also perform authorization operations for the virtual machine 245. That is, upon determining the identity of the virtual machine 245, the cryptex server 134 may then determine whether the decrypted token should be provided to the virtual machine 245. For example, the cryptex server 134 could determine that a particular security token is intended only for deployment in the United States (e.g., based on data within the token, based on preconfigured data on the cryptex server 134, by querying another server, etc.). If the cryptex server 134 authenticates the virtual machine 245 and determines that the virtual machine 245 is deployed in Ireland, the cryptex server 134 could deny the virtual machine's 245 decryption request. Advantageously, doing so can help to prevent situations where the decrypted token is provided to the wrong virtual machine.

Returning to the present example, upon authenticating the virtual machine 245, the cryptex server 134 decrypts the encrypted security token (block 280), and returns the decrypted token to the application 248 (block 285). Advantageously, doing so provides an automated and secure method for deploying a security token from a development environment to an application hosted in a cloud environment. Additionally, by using the virtual machine's 245 network information and metadata from the cloud management system 136, the depicted method is able to overcome the problem of the application 248 being unable to authenticate itself using the security credential when originally requesting the security credential.

Of note, in one embodiment, the encrypted security token may contain information used for authentication purposes. For instance, the security token may specify a verifiable machine image label and allowed security group names, and the cryptex server 134 could use the verifiable machine image label and the allowed security group names to authenticate the virtual machine 245 (and/or the application 248). Thus, in such an example, the cryptex server 134 may decrypt the encrypted security token to extract this information for use in authenticating the virtual machine 245 (and/or the application 248), and then once the virtual machine 245 is authenticated, the cryptex server 134 could return the decrypted security token to the application 248.

Figure 3:
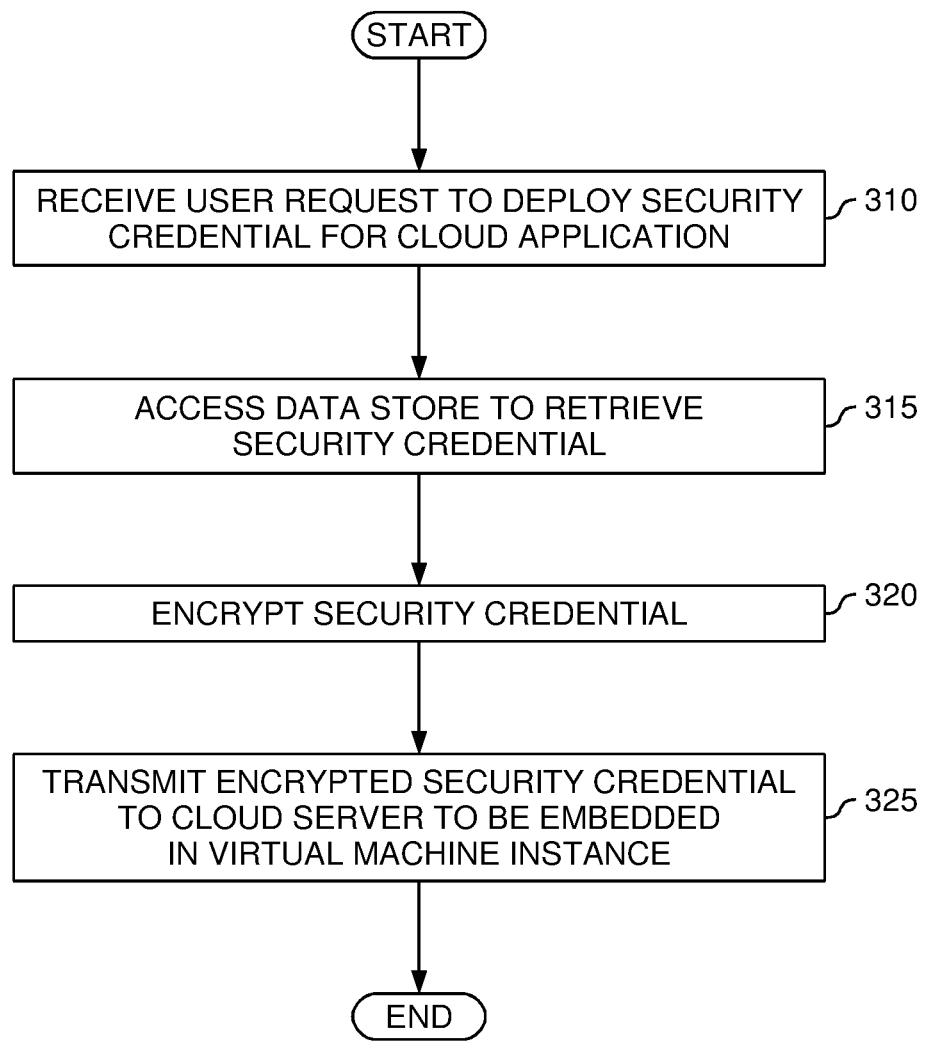
FIG. 3 is a flow diagram illustrating a method for staging an encrypted security credential for deployment to a virtual machine instance in a cloud, according to one embodiment described herein.

FIG. 3 is a flow diagram illustrating a method for staging an encrypted security credential for deployment to a virtual machine instance in a cloud, according to one embodiment described herein. As shown, the method 300 begins at block 310, where a cryptex server receives a user request to deploy a security credential for an application executing in a cloud computing environment. Generally, the request specifies information identifying the application for which the security credential is being deployed (e.g., an identifier for the application, a virtual machine identifier on which the application is running, a URL or other address associated with the application, etc.). Additionally, the request could also contain information for authenticating and authorizing the request (or the user submitting the request). For instance, the request could contain login and password information associated with the user submitting the request.

The cryptex server then accesses a data store (e.g., a database) to retrieve the security credential (block 315). For instance, the cryptex server could transmit a request to the data store that specifies login and password information included in the initial request for deploying the security credential. In such an example, the data store could be configured to perform authentication and authorization operations for the request and, upon authenticating and authorizing the request, the data store could return the requested security credential to the cryptex server.

Upon receiving the security credential, the cryptex server could encrypt the security credential (block 320). For example, the cryptex server could encrypt the security credential using RSA public key/private key encryption techniques. As discussed above, the cryptex server could also include additional information within the encrypted security credential, such as (without limitation) a timestamp specifying when the security credential is encrypted and a network address of a system from which the security credential was received. The cryptex server could also include information specifying one or more requirements for deployment of the security credential. Such information could specify, for instance, how the security credential is to be deployed, where the security credential can be deployed, when the security credential may be deployed, and so on. Such information could subsequently be used in performing authorization operations to ensure that the security credential is properly deployed. The cryptex server then transmits the encrypted security credential to a cloud computing system, where the cloud computing system is configured to embed the encrypted security credential into a virtual machine image associated with the application for which the security credential is being deployed (block 325). Once the encrypted security credential is transmitted to the cloud system, the method 300 ends.

Figure 4:
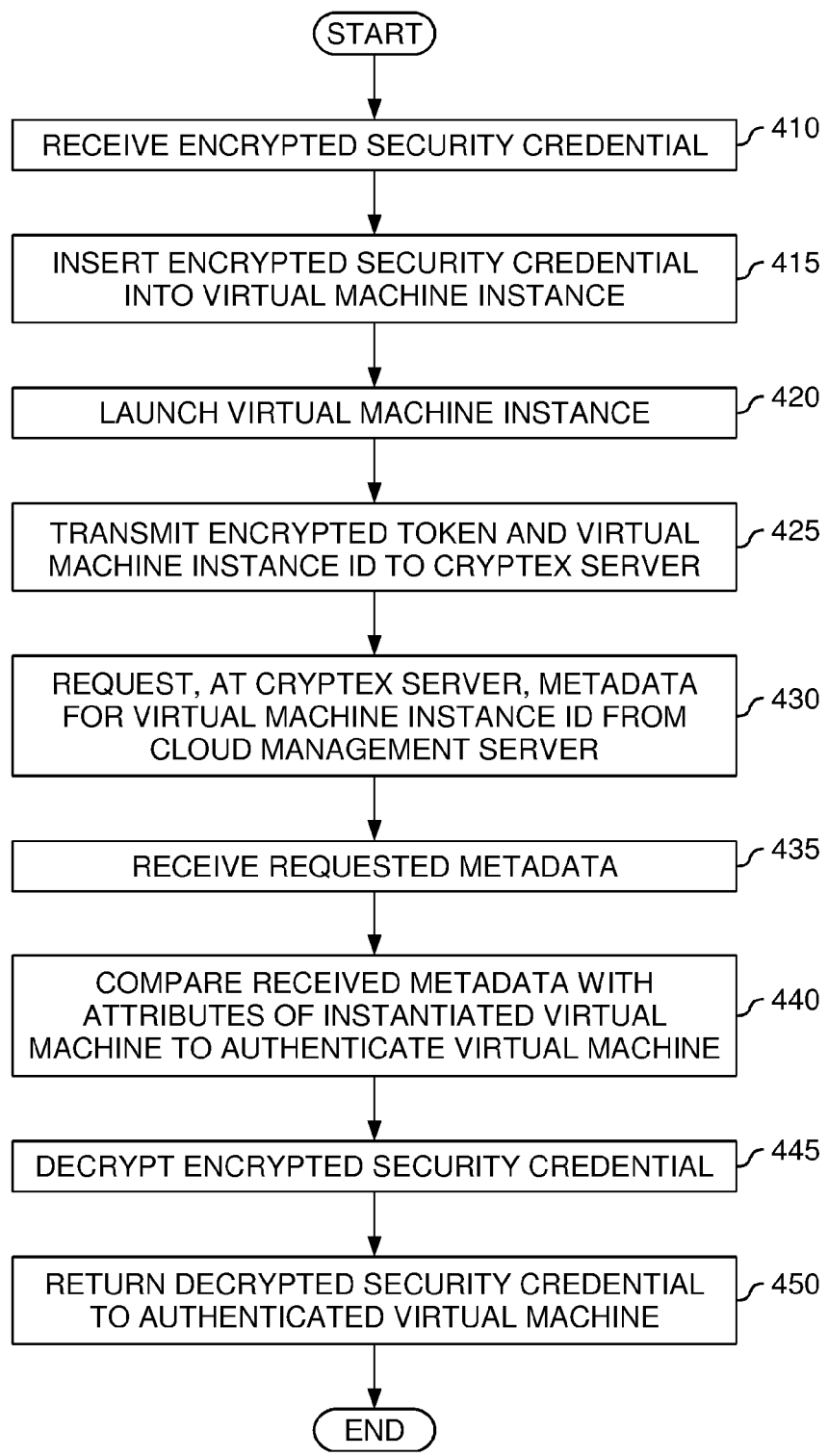
FIG. 4 is a flow diagram illustrating a method for deploying a decrypted security credential to a virtual machine instance in a cloud, according to one embodiment described herein.

FIG. 4 is a flow diagram illustrating a method for deploying a decrypted security credential to a virtual machine image in a cloud, according to one embodiment described herein. As shown, the method 400 begins at block 410, where a cloud system receives an encrypted security credential. The cloud system (or more specifically, software executing on the cloud system) then inserts the encrypted security credential into a virtual machine image associated with the application for which the security credential is being deployed (block 415). For instance, in addition to receiving the encrypted security credential, the cloud system could also receive information specifying a particular virtual machine image on which the application resides. The cloud system could then insert the encrypted security credential into the specified virtual machine image.

The virtual machine image is then launched as a virtual machine within the cloud computing environment (block 420). Software on the deployed virtual machine transmits a decryption request including the encrypted security credential and a virtual machine identifier (e.g., a unique identifier assigned to each virtual machine deployed within the cloud computing environment) to a cryptex server (block 425). Upon receiving the encrypted security credential and the virtual machine identifier, the cryptex server requests metadata associated with the virtual machine from a cloud management server (block 430). For example, the cryptex server could transmit a request specifying the virtual machine identifier and the cloud management server could return metadata describing the virtual machine in response to the request. Such metadata could specify, for instance, a network address assigned to the deployed virtual machine associated with the specified virtual machine identifier, an identifier for the application for which the security credential was deployed, a security group of the virtual machine associated with the specified virtual machine identifier, a logical cloud location for the virtual machine associated with the specified virtual machine identifier, and so on.

The cryptex server receives the requested metadata from the cloud management system (block 435) and compares the received metadata with attributes of the deployed virtual machine to authenticate the deployed virtual machine (block 440). For example, the cryptex server could compare a network address specified in the metadata (e.g., the network address assigned to the virtual machine associated with the virtual machine identifier) with the network address from which the decryption request was received in order to authenticate the requesting application. Upon authenticating the requesting application, the cryptex server decrypts the encrypted security credential (block 445) and returns the decrypted security credential to the authenticated virtual machine (block 450). As discussed above, in a particular embodiment, the cryptex server may decrypt the encrypted security credential to extract information used in authenticating the deployed virtual machine (i.e., in block 440). In such an embodiment, the cryptex server could still return the decrypted security credential to the virtual machine only once the virtual machine is authenticated. Once the decrypted security credential is return, the method 400 ends.

Figure 5:
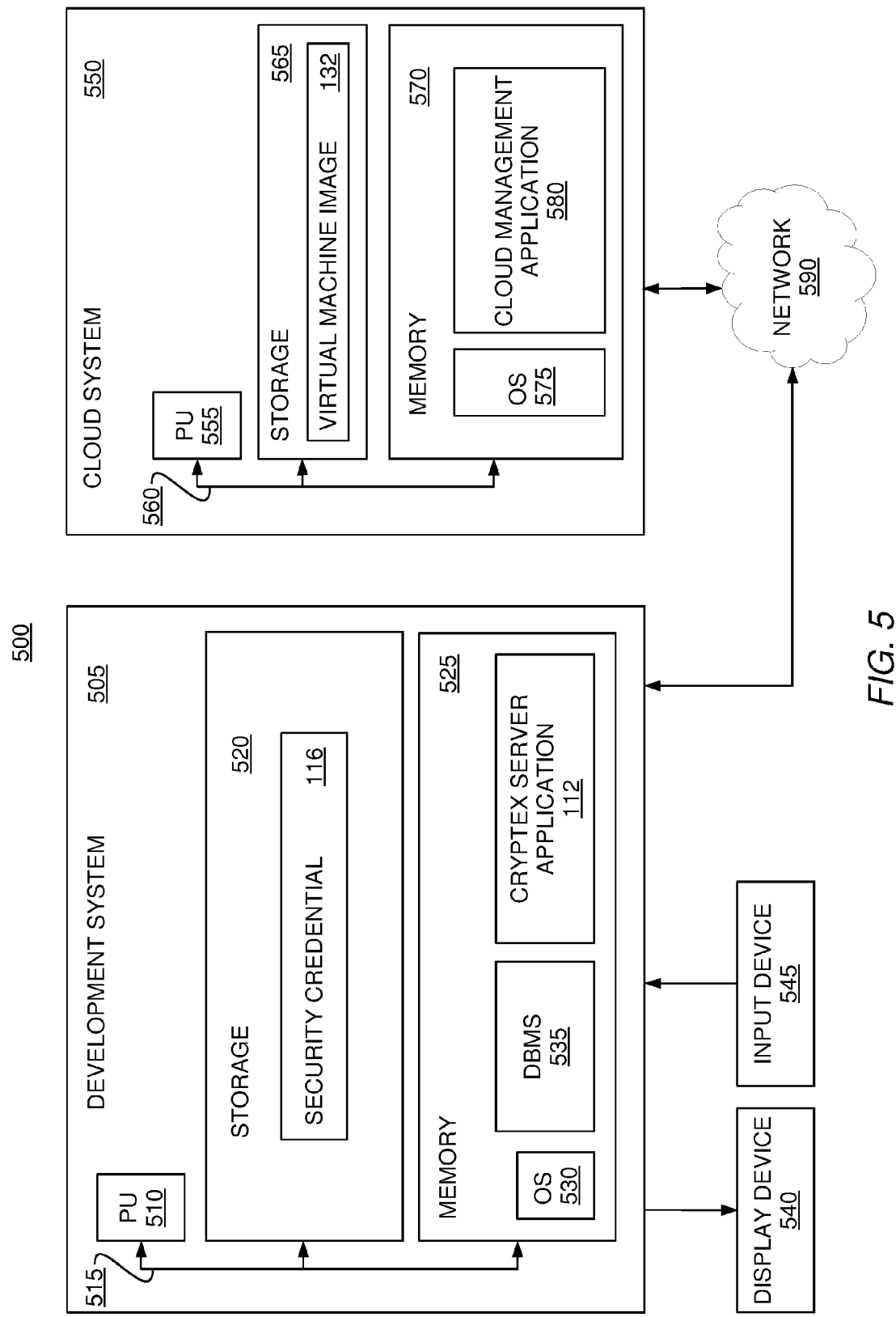
FIG. 5 is a block diagram illustrating a system configured to implement one or more aspects of the present invention.

FIG. 5 is a block diagram illustrating a system configured to implement one or more aspects of the present invention. As shown, the system 500 includes a development system 505 connected to a cloud system 550 via a network 590. The development system 505 includes, without limitation, a processor 510, storage 520, and memory 525, interconnected via a bus 515. Generally, the processor 510 retrieves and executes programming instructions stored in the memory 525. Processor 510 is included to be representative of a single CPU, multiple CPUs, a single CPU having multiple processing cores, GPUs having multiple execution paths, and the like. The memory 525 is generally included to be representative of a random access memory. The development system 505 may also include a network interface that enables the development system 505 to connect to the data communications network 590 (e.g., wired Ethernet connection or an 802.11 wireless network). Further, while the depicted embodiment illustrates the components of a development system 505, one of ordinary skill in the art will recognize that other development systems could use a variety of different hardware architectures consistent with the present disclosure. Moreover, it is explicitly contemplated that embodiments may be implemented using any device or computer system capable of performing the functions described herein.

The memory 525 represents any memory sufficiently large to hold the necessary programs and data structures. Memory 525 could be one or a combination of memory devices, including Random Access Memory, nonvolatile or backup memory (e.g., programmable or Flash memories, read-only memories, etc.). In addition, memory 525 and storage 520 may be considered to include memory physically located elsewhere; for example, on another computer communicatively coupled to the development system 505. Illustratively, the memory 525 includes an operating system 530, a database management system (DBMS) 535 and a cryptex server application 112. The operating system 530 generally controls the execution of application programs on the client device $110_1$. Examples of operating system 530 include UNIX, a version of the Microsoft Windows® operating system, and distributions of the Linux® operating system.

The development system 505 is coupled to display device 540 and an input device 545. The input device 545 could represent a variety of different input devices, such as a keyboard, a mouse, and a touch screen. Likewise, the display device 540 could be any device capable of displaying an interface for the development system 505 (e.g., a monitor, a touch screen on a portable gaming device, a television display, etc.)

Similarly, the cloud system 550 includes a processor 555, storage 565, and memory 570, interconnected via a bus 560. Generally, the processor 555 retrieves and executes programming instructions stored in the memory 570. Processor 555 is included to be representative of a single CPU, multiple CPUs, a single CPU having multiple processing cores, GPUs having multiple execution paths, and the like. The memory 570 is generally included to be representative of a random access memory. The cloud system 550 may also include a network interface that enables the cloud system 550 to connect to the data communications network 590 (e.g., wired Ethernet connection or an 802.11 wireless network). Further, while the depicted embodiment illustrates the components of a particular cloud system 550, one of ordinary skill in the art will recognize that the cloud system 550 may use a variety of different hardware architectures. Moreover, it is explicitly contemplated that embodiments may be implemented using any device(s) or computer system(s) capable of performing the functions described herein.

The memory 570 represents any memory sufficiently large to hold the necessary programs and data structures. Memory 570 could be one or a combination of memory devices, including Random Access Memory, nonvolatile or backup memory (e.g., programmable or Flash memories, read-only memories, etc.). In addition, memory 570 and storage 565 may be considered to include memory physically located elsewhere; for example, on another computer communicatively coupled to the cloud system 550. As shown, the storage 565 contains a virtual machine image 132, which represents one or more files that can be deployed as a virtual machine within the cloud environment. Illustratively, the memory 570 includes an operating system 575 and a cloud management application 580. The operating system 575 generally controls the execution of application programs on the cloud system 550. Examples of operating system 575 include UNIX, a version of the Microsoft Windows® operating system, and distributions of the Linux® operating system.

As discussed above, embodiments generally provide techniques for deploying a security credential for an application deployed in a cloud. For instance, the cryptex server application 112 could receive a request to deploy the security credential. The request could designate the application for which the security credential 116 is to be deployed and could include authentication information for obtaining the security credential 116. The cryptex server application 112 could access the DBMS 535 using the authentication information to retrieve the security credential 116 from a database managed by the DBMS 535. In one embodiment, the cryptex server application 112 is configured to manage and store the security credential 116. The cryptex server application 112 could then encrypt the security credential 116 and could transmit the encrypted security credential to the cloud system 550.

The cloud management application 580 could receive the encrypted security credential from the development system 505 and could insert the encrypted security credential into the virtual machine image 132 associated with the application (i.e., the virtual machine image on which the application resides). Upon deploying the virtual machine image 132, software on the deployed virtual machine (e.g., the application for which the security credential is being deployed) could transmit a request to the cryptex server application 112 for a decrypted security credential. The request could include the encrypted security credential and a virtual machine instance identifier for the deployed virtual machine. Although in the current example this request is transmitted to the cryptex server application 112 residing on the development system 505, it is broadly contemplated that such a request could be transmitted to a cryptex server residing elsewhere in the development environment, in the cloud environment (e.g., on cloud system 550), or more generally in any other environment accessible by the cloud system 550 (e.g., using the network 590). Upon receiving the request, the cryptex server application 112 is configured to retrieve metadata associated with the virtual machine identifier and to authenticate the application running on the deployed virtual machine using the retrieved metadata. Upon authenticating and authorizing the application, the cryptex server application 112 could decrypt the encrypted security credential and return the decrypted security credential to the deployed virtual machine. The application running on the deployed virtual machine can then use the decrypted security credential. Advantageously, doing so provides a secure and efficient technique for deploying a security credential to an application executing in a cloud computing environment.

In the foregoing description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Additionally, while the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A method of deploying a security credential for an application deployed in a cloud, comprising:
receiving an encrypted security credential from a remote system;
inserting, by operation of one or more computer processors, the encrypted security credential into a virtual machine image associated with the application;
upon deploying the virtual machine image as a virtual machine instance, transmitting a request to a cryptex server for a decrypted security credential, the request including the encrypted security credential and a virtual machine instance identifier for the deployed virtual machine image, wherein the cryptex server is configured to retrieve metadata associated with the virtual machine identifier and to authenticate and authorize the virtual machine instance using the retrieved metadata; and
receiving, from the cryptex server, the decrypted security credential for use by the application.

2. The method of claim 1, wherein the retrieved metadata includes a network address, and wherein the cryptex server is configured to authenticate the virtual machine instance by comparing the network address in the retrieved metadata to a second network address of a computing system from which the transmitted request was received.

3. The method of claim 1, wherein the retrieved metadata includes a virtual machine image label, and wherein the cryptex server is configured to authenticate the virtual machine instance by comparing the virtual machine image label in the retrieved metadata to a second virtual machine image label associated with a virtual machine from which the transmitted request was received.

4. The method of claim 1, wherein the cryptex server is configured to decrypt the encrypted security credential, upon authenticating the virtual machine instance.

5. The method of claim 1, wherein a plurality of virtual machine instances are deployed in the cloud, wherein each of the plurality of virtual machine instances cloud is assigned a respective unique identifier by a cloud management system, and wherein the virtual machine instance identifier is the unique identifier assigned to the deployed virtual machine instance.

6. The method of claim 1, wherein metadata associated with the encrypted security credential specifies a deployment system identifier corresponding to a system on which the encrypted security credential is intended to be deployed, and wherein the cryptex server is further configured to authenticate and authorize the virtual machine instance based on the deployment system identifier.

7. A non-transitory computer-readable medium containing a program that, when executed, performs an operation for deploying a security credential for an application deployed in a cloud, the operation comprising:
receiving an encrypted security credential from a remote system;
inserting the encrypted security credential into a virtual machine image associated with the application;
upon deploying the virtual machine image as a virtual machine instance, transmitting a request to a cryptex server for a decrypted security credential, the request including the encrypted security credential and a virtual machine instance identifier for the virtual machine instance, wherein the cryptex server is configured to retrieve metadata associated with the virtual machine identifier and to authenticate and authorize the virtual machine instance using the retrieved metadata; and receiving, from the cryptex server, the decrypted security credential for use by the application.

8. The non-transitory computer-readable medium of claim 7, wherein the retrieved metadata includes a network address, and wherein the cryptex server is configured to authenticate the virtual machine instance by comparing the network address in the retrieved metadata to a second network address of a computing system from which the transmitted request was received.

9. The non-transitory computer-readable medium of claim 7, wherein the retrieved metadata includes a virtual machine image label, and wherein the cryptex server is configured to authenticate the virtual machine instance by comparing the virtual machine image label in the retrieved metadata to a second virtual machine image label associated with a virtual machine from which the transmitted request was received.

10. The non-transitory computer-readable medium of claim 7, wherein the cryptex server is configured to decrypt the encrypted security credential, upon authenticating the virtual machine instance.

11. The non-transitory computer-readable medium of claim 7, wherein a plurality of virtual machine instances are deployed in the cloud, wherein each of the plurality of virtual machine instances cloud is assigned a respective unique identifier by a cloud management system, and wherein the virtual machine instance identifier is the unique identifier assigned to the deployed virtual machine instance.

12. The non-transitory computer-readable medium of claim 7, wherein metadata associated with the encrypted security credential specifies a deployment system identifier corresponding to a system on which the encrypted security credential is intended to be deployed, and wherein the cryptex server is further configured to authenticate and authorize the deployed virtual machine instance based on the deployment system identifier.

13. A system, comprising:
a processor; and
a memory containing a program that, when executed on the processor, performs an operation for deploying a security credential for an application deployed in a cloud, the operation comprising:
receiving an encrypted security credential from a remote system;
inserting the encrypted security credential into a virtual machine image associated with the application;
upon deploying the virtual machine image as a virtual machine instance, transmitting a request to a cryptex server for a decrypted security credential, the request including the encrypted security credential and a virtual machine instance identifier for the virtual machine instance, wherein the cryptex server is configured to retrieve metadata associated with the virtual machine identifier and to authenticate and authorize the virtual machine instance using the retrieved metadata; and
receiving, from the cryptex server, the decrypted security credential for use by the application.

14. The system of claim 13, wherein the retrieved metadata includes a network address, and wherein the cryptex server is configured to authenticate the deployed virtual machine instance by comparing the network address in the retrieved metadata to a second network address of a computing system from which the transmitted request was received.

15. The system of claim 13, wherein the retrieved metadata includes a virtual machine image label, and wherein the cryptex server is configured to authenticate the virtual machine instance by comparing the virtual machine image label in the retrieved metadata to a second virtual machine image label associated with a virtual machine from which the transmitted request was received.

16. The system of claim 13, wherein the cryptex server is configured to decrypt the encrypted security credential, upon authenticating the virtual machine instance.

17. The system of claim 13, wherein a plurality of virtual machine instances are deployed in the cloud, wherein each of the plurality of virtual machine instances cloud is assigned a respective unique identifier by a cloud management system, and wherein the virtual machine instance identifier is the unique identifier assigned to the deployed virtual machine instance.

18. The system of claim 13, wherein metadata associated with the encrypted security credential specifies a deployment system identifier corresponding to a system on which the encrypted security credential is intended to be deployed, and wherein the cryptex server is further configured to authenticate and authorize the virtual machine instance based on the deployment system identifier.

* * * * *